May 31, 1932. F. E. STAHL ET AL 1,860,695
TIRE CHAIN FASTENER
Filed July 30, 1930
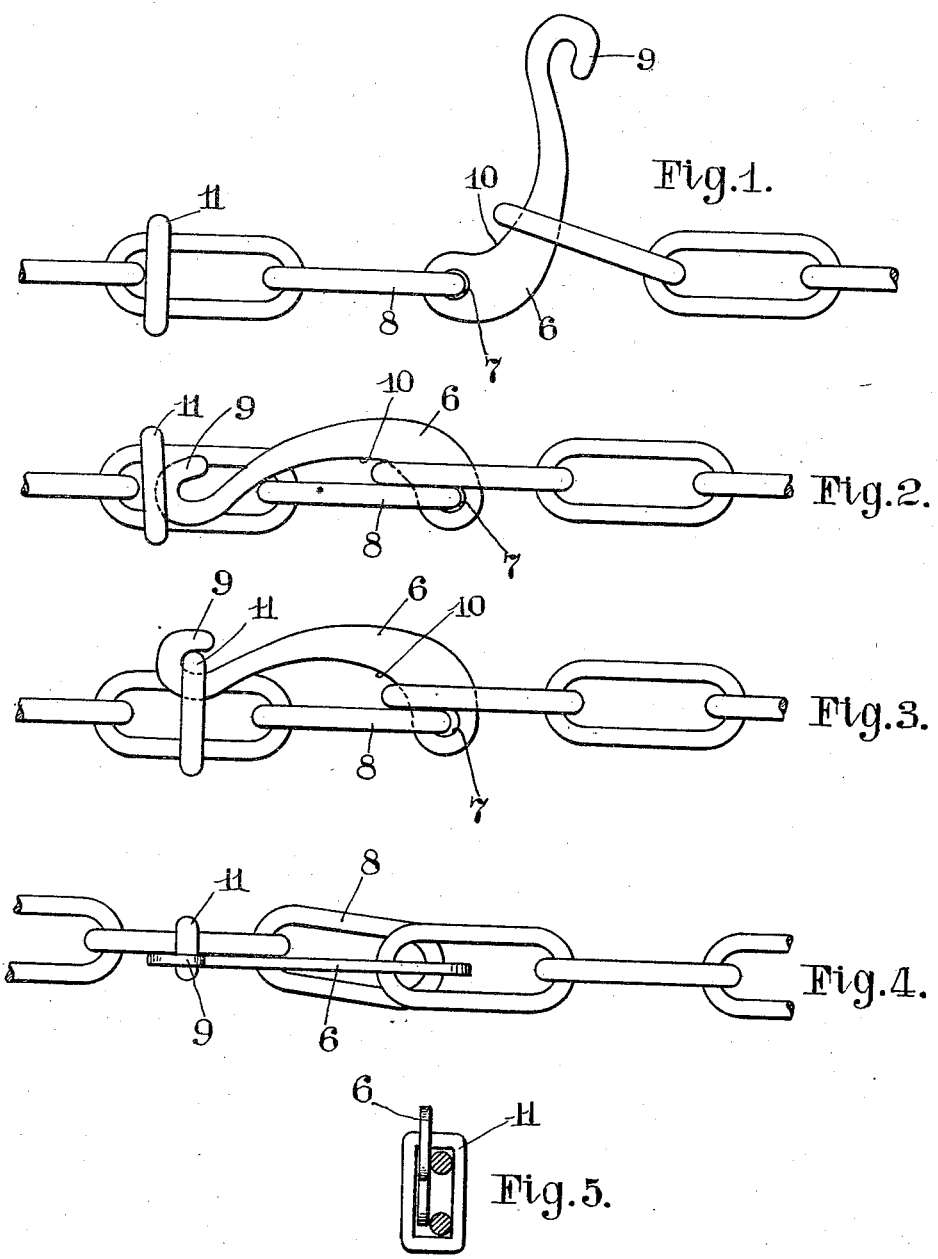
Inventors
FRANK E. STAHL
HARVEY DUDLEY
By Finckel & Finckel
Their Attorneys Patented May 31, 1932

1,860,695

UNITED STATES PATENT OFFICE

FRANK E. STAHL, OF TONAWANDA, NEW YORK, AND HARVEY DUDLEY, OF ST. CATHERINES, ONTARIO, CANADA, ASSIGNORS TO THE COLUMBUS-McKINNON CHAIN CORPORATION, OF TONAWANDA, NEW YORK, A CORPORATION OF NEW YORK

TIRE CHAIN FASTENER

Application filed July 30, 1930. Serial No. 471,817.

This invention relates to anti-skid tire chain fasteners and has for its objects to provide an improved and simplified means whereby such a fastener can be produced at low cost, and be easily manipulated for application and removal by the user. Other objects will appear from the disclosure.

According to the invention an end link of a rim or side chain has pivoted to it a cam lever provided with a hook 9 at its free end, said cam lever being first hooked into the link of the other end of the side or rim chain and then engaged with a sliding keeper link transversely embracing the link next adjacent that carrying the cam lever with the cam lever lying across the face of the link carrying the keeper.

The invention is embodied in the example herein shown and described the features of novelty being finally claimed.

In the accompanying drawings—

Figure 1 illustrates in side view the two ends of a side chain one of which is equipped with the fastener lever placed in the end link of the other end according to the invention.

Fig. 2 shows the fastener lever drawn down into position preparatory to having the keeper applied.

Fig. 3 shows the keeper applied.

Fig. 4 is a top plan view of Fig. 3 showing the keeper applied.

Fig. 5 is a cross section of the link of the chain carrying the keeper with the keeper in full lines.

In the views 6 designates the fastener lever, it having an eye 7 by which the lever is loosely connected to the end link of one of the rim or side chains 8. Said lever is shown as made of flat metal and has its free end formed with a reversely extending hook lying in the same plane as the body of hook. Said lever also has a cam edge 10 to draw the end link of the other end of the side chain.

11 designates the keeper, it consisting, in the instance shown of a shorter link standing loosely and crosswise on the link next to the end link containing the cam fastener lever 6.

The keeper link is of a transverse internal diameter to permit it to be slid past the hook end of the cam lever 6, so that when the chain is straightened, as in use, the lever is retained in fastening position.

In practice the keeper link 11 is first passed over the lever onto its link of the chain and then the cam lever, after insertion in the end link of the other end of the side chain, is drawn toward the end containing the keeper and pressed down, as shown in Fig. 2, thereby drawing up the slack in the chain. Then by flexing the chain slightly so that the cam lever shall lie flat against the face of the link having thereon the keeper link (see Fig. 4) the latter link can be easily slipped over the end of the cam lever and its hook. Ordinarily the tension of the connected ends of the side chain will hold the cam lever up with the keeper engaged in the hook as seen in Fig. 3 and the cam lever cannot be released from the keeper except by intentionally substantially reversing the operation for effecting the connection. The chance of accidental releasing of the fastener is extremely remote. It will be noted that the operation of either securing or releasing the chain ends is quite simple and can be quickly performed. Further, because the links are of the variety universally movable on one another, the keeper 11 moves across and lies adjacent the face of the link containing said keeper 11.

The forms of the parts can be changed without departing from the gist of the invention as claimed.

What we claim is:

A tire chain fastener for the ends of a side chain composed of substantially flat links universally movable with respect to one another, said fastener including a lever pivoted at one end to a link at one end of the side chain and engage the end link of the other end of the side chain, said lever having a hook at its free end lying in the plane of the lever and adapted to be moved in a plane parallel to the face of the next link in the first mentioned end of the chain, and a keeper consisting of a link transversely embracing said next link adapted to be slid onto said hook of the lever to effect engagement therewith when the hook is depressed to lie parallel to and opposite a face of said next link.

FRANK E. STAHL.
HARVEY DUDLEY.